US012700052B2

(12) United States Patent
Shin

(10) Patent No.: US 12,700,052 B2
(45) Date of Patent: Aug. 4, 2026

(54) CROSS-CERTIFICATE METHOD AND DEVICE FOR ELECTRIC VEHICLE CHARGING

(71) Applicants: Hyundai Motor Company, Seoul (KR); Kia Corporation, Seoul (KR); Myongji University Industry and Academia Cooperation Foundation, Yongin (KR)

(72) Inventor: Min Ho Shin, Yongin (KR)

(73) Assignees: Hyundai Motor Company, Seoul (KR); Kia Corporation, Seoul (KR); Myongji University Industry and Academia Cooperation Foundation, Yongin (KR)

( * ) Notice: Subject to any disclaimer, the term of this patent is extended or adjusted under 35 U.S.C. 154(b) by 1 day.

(21) Appl. No.: 18/779,793

(22) Filed: Jul. 22, 2024

(65) Prior Publication Data

US 2024/0380612 A1    Nov. 14, 2024

Related U.S. Application Data

(63) Continuation of application No. 17/606,621, filed as application No. PCT/KR2020/005641 on Apr. 29, 2020.

(Continued)

(30) Foreign Application Priority Data

Apr. 28, 2020    (KR) ........................ 10-2020-0051201

(51) Int. Cl.
*G06Q 50/40* (2024.01)
*B60L 53/66* (2019.01)
(Continued)

(52) U.S. Cl.
CPC .............. *G06Q 50/40* (2024.01); *B60L 53/66* (2019.02); *B60L 55/00* (2019.02); *H04L 9/0825* (2013.01); *H04L 9/3265* (2013.01)

(58) Field of Classification Search
CPC .. G06Q 50/40; G06Q 30/018; G06Q 30/0609; G06Q 2220/00; G06Q 30/04;
(Continued)

(56) References Cited

U.S. PATENT DOCUMENTS 6,134,550 A    10/2000  Van Oorschot et al.
6,865,674 B1    3/2005  Mancini et al.
(Continued)

FOREIGN PATENT DOCUMENTS

EP    2232761 B1    9/2010
EP    2574495 A2    4/2013
(Continued)

OTHER PUBLICATIONS

Khan, Ehsanul. A Multi-Vendor Model for Authenticating Electric Vehicles in Smart Grid Systems using RSA and ECC. Diss. Université d'Ottawa/University of Ottawa, 2016. (Year: 2016).*
(Continued)

*Primary Examiner* — Techane Gergiso
(74) *Attorney, Agent, or Firm* — Fox Rothschild LLP

(57) ABSTRACT

A cross-certificate method is performed by an electric vehicle (EV) for being supplied with power from electric vehicle supply equipment (EVSE) associated with a charging point operator (CPO) having established a trust relationship with a first vehicle to grid (V2G) root certificate authority (rootCA) and a second V2G root certificate authority. The cross-certificate method may include steps of: requesting charging from the electric vehicle supply equipment; receiving, from the electric vehicle supply equipment, a certificate chain held by the electric vehicle supply equip-
(Continued)

ment; and verifying whether or not a last certificate of the certificate chain has been signed by the second V2G root certificate authority, wherein the last certificate of the certificate chain can be a cross-certificate issued by the second V2G root certificate authority.

17 Claims, 11 Drawing Sheets

Related U.S. Application Data

(60) Provisional application No. 62/933,018, filed on Nov. 8, 2019, provisional application No. 62/927,887, filed on Oct. 30, 2019, provisional application No. 62/839,996, filed on Apr. 29, 2019.

(51) Int. Cl.
| | | |
|---|---|---|
| *B60L 55/00* | (2019.01) | |
| *H04L 9/08* | (2006.01) | |
| *H04L 9/32* | (2006.01) | |

(58) Field of Classification Search
CPC ......... G06Q 50/06; B60L 55/00; B60L 53/66; H04L 9/0825; H04L 9/3265; H04L 2209/84; H04L 63/166; H04L 9/321; H04L 9/3247; H04L 63/0823; B60Y 2200/91; Y02T 90/167; Y02T 90/14; Y02T 90/16; Y04S 50/12; Y04S 50/10; H04W 12/069; H04W 4/44
See application file for complete search history.

(56) References Cited

U.S. PATENT DOCUMENTS

| | | | | |
|---|---|---|---|---|
| 7,290,133 | B1 | 10/2007 | Montgomery | |
| 7,904,722 | B2 | 3/2011 | Sudia et al. | |
| 8,539,225 | B2 | 9/2013 | Guo et al. | |
| 8,627,064 | B2 | 1/2014 | Salvarani et al. | |
| 9,621,352 | B2 | 4/2017 | Brown et al. | |
| 10,017,067 | B2 * | 7/2018 | Gröning | B60L 53/60 |
| 10,057,067 | B2 | 8/2018 | Choi et al. | |
| 10,195,956 | B2 * | 2/2019 | Shuaib | B60L 53/665 |
| 10,414,281 | B2 * | 9/2019 | Rodine | G06F 21/629 |
| 10,949,843 | B2 * | 3/2021 | Mouftah | H04L 9/3234 |
| 11,405,873 | B2 * | 8/2022 | Park | H04B 5/79 |
| 11,520,881 | B2 * | 12/2022 | Wang | G06F 21/64 |
| 11,606,215 | B2 * | 3/2023 | Sorensen | H04L 9/0877 |
| 11,641,220 | B2 * | 5/2023 | Park | H02J 50/80 |
| | | | | 726/6 |
| 2004/0185842 | A1 * | 9/2004 | Spaur | B60R 25/33 |
| | | | | 455/410 |

| | | | | |
|---|---|---|---|---|
| 2009/0240941 | A1 | 9/2009 | Lee et al. | |
| 2011/0154027 | A1 | 6/2011 | Liu et al. | |
| 2011/0200193 | A1 * | 8/2011 | Blitz | H04W 12/126 |
| | | | | 707/769 |
| 2013/0212659 | A1 * | 8/2013 | Maher | G05D 1/0022 |
| | | | | 726/6 |
| 2015/0189581 | A1 | 7/2015 | Katar et al. | |
| 2016/0052416 | A1 * | 2/2016 | Wietfeld | G07F 15/005 |
| | | | | 701/31.4 |
| 2017/0024552 | A1 * | 1/2017 | Rodine | H04W 4/80 |
| 2017/0111178 | A1 * | 4/2017 | Winkelvos | H04W 12/0431 |
| 2018/0186309 | A1 * | 7/2018 | Batten | G09G 3/36 |
| 2018/0336551 | A1 * | 11/2018 | Mouftah | H04L 9/3213 |
| 2019/0165950 | A1 * | 5/2019 | Ibrahim | H04L 9/3268 |
| 2019/0342859 | A1 * | 11/2019 | Rubin | H04W 4/12 |
| 2020/0233956 | A1 * | 7/2020 | Wang | B60L 53/305 |
| 2020/0238847 | A1 * | 7/2020 | Wiseman | B60L 53/67 |
| 2020/0389060 | A1 * | 12/2020 | Park | H02J 50/60 |
| 2021/0058396 | A1 * | 2/2021 | Nathanson | H04W 4/24 |
| 2021/0408838 | A1 * | 12/2021 | Park | H02J 7/00034 |

FOREIGN PATENT DOCUMENTS

| | | | |
|---|---|---|---|
| JP | 2003-316655 | A | 11/2003 |
| JP | 2005-124097 | A | 5/2005 |
| JP | 2014-524695 | A | 9/2014 |
| KR | 10-2008-0001574 | A | 1/2008 |
| KR | 101353904 | B1 | 1/2014 |
| KR | 101377570 | B1 | 3/2014 |
| KR | 2018-0116021 | A | 10/2018 |
| KR | 2019-0036115 | A | 4/2019 |

OTHER PUBLICATIONS

B. Vaidya, D. Makrakis and H. T. Mouftah, "Multi-domain Public key infrastructure for Vehicle-to-Grid network," MILCOM 2015—2015 IEEE Military Communications Conference, Tampa, FL, USA, 2015, pp. 1572-1577, doi: 10.1109/MILCOM.2015.7357669. (Year: 2015).*

Vaidya, B. et al., "Multi-domain Public Key Infrastructure for Vehicle-to-Grid Network", Milcom 2015 , IEEE, Track 3—Cyber Security and Trusted Computing, pp. 1572-1577.

Vaidya, B. et al., "Effective Public Key Infrastructure for Vehicle-to-Grid Network", Univeristy of Ottawa, DIVANet'14, Sep. 21-26, 2014, pp. 95-101.

Bao, K. et al., "A threat analysis of the vehicle-to-grid charging protocol ISO 15118", Comput Sci Res Dev (2018) 33:3-12.

Cooper, D. et al., "Internet X. 509 Public Key Infrastruture Certificate and Certificate Revocation List (CRL) Profile", May 2008, 151 pages, RFC 5280—Internet X.509 Public Key Inf.

ISO15118-2:2014(E) V2GC1_Part2-Ed1.0_2014.04.

* cited by examiner

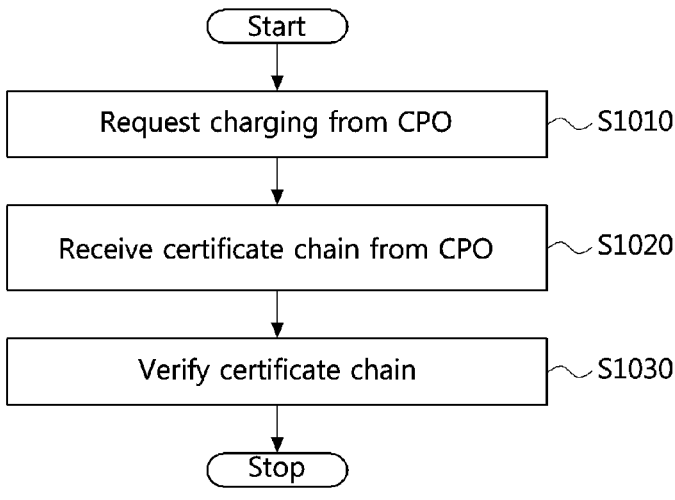

Start

Request charging from CPO　　～S1010

Receive certificate chain from CPO　　～S1020

Verify certificate chain　　～S1030

Stop

FIG. 11

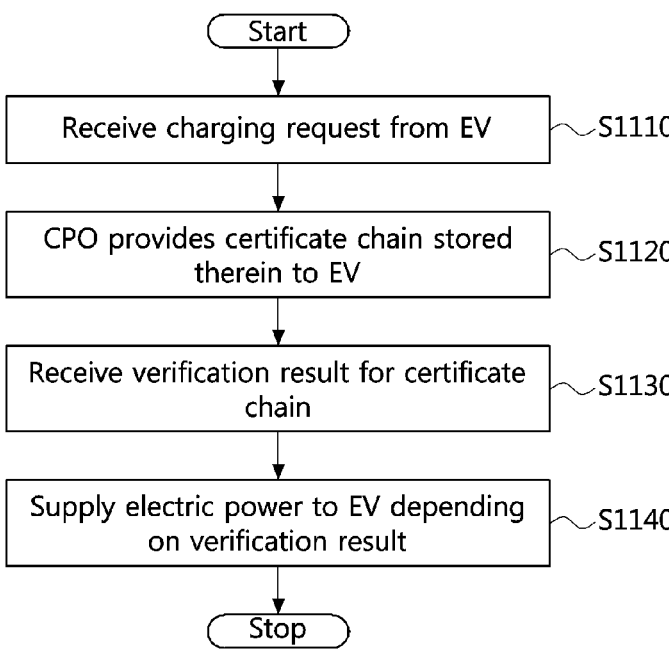

Start

Receive charging request from EV　　～S1110

CPO provides certificate chain stored therein to EV　　～S1120

Receive verification result for certificate chain　　～S1130

Supply electric power to EV depending on verification result　　～S1140

Stop

FIG. 12

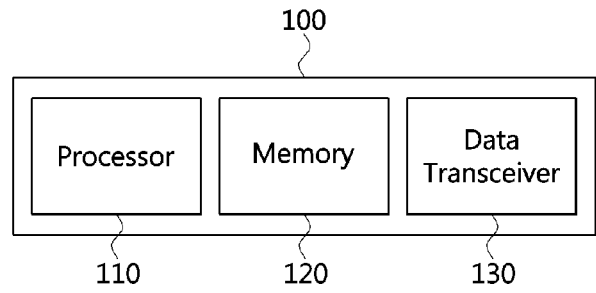

100

| Processor | Memory | Data Transceiver |

110　　120　　130

CROSS-CERTIFICATE METHOD AND DEVICE FOR ELECTRIC VEHICLE CHARGING

CROSS-REFERENCE TO RELATED APPLICATIONS

This application is a continuation of U.S. patent application Ser. No. 17/606,621, filed on Oct. 26, 2021, which is a National Phase of International Patent Application No. PCT/KR2020/005641, filed Apr. 29, 2020, which claims the benefit of U.S. Provisional Application No. 62/933,018, filed Nov. 8, 2019, U.S. Provisional Application No. 62/927,887, filed Oct. 30, 2019, and U.S. Provisional Application No. 62/839,996, filed Apr. 29, 2019, the entire contents of which are incorporated herein by reference.

BACKGROUND

(a) Technical Field

The present disclosure relates to a cross certification method and apparatus, more particularly, to the cross certification method and apparatus for use in an electric vehicle charging and a power transfer method using cross certification.

(b) Description of the Related Art

An electric vehicle (EV) is driven by an electric motor by power stored in a battery, and produces less pollution such as exhaust gas and noise compared with a conventional gasoline engine vehicle, fewer faults, a longer life span, and advantageously, operation of the EV is simplified.

Typically EVs are classified into hybrid electric vehicles (HEVs), plug-in hybrid electric vehicles (PHEVs), and electric vehicles (EVs), based on a driving source. The HEV has an engine as a main power source and a motor as an auxiliary power source. The PHEV has a main power motor and an engine used when a battery is discharged. The EV has a motor, but the EV does not have an engine.

An electric vehicle charging system may be defined as a system that charges a battery mounted in an electric vehicle using power obtained from a commercial power grid or stored in an energy storage device. Such an electric vehicle charging system may have various forms depending on a type of the electric vehicle. For example, the electric vehicle charging system may include a conductive charging system using a cable or a non-contact wireless power transfer system.

In this regard, an eMobility service is a business segment that provides a service of supplying electricity to an EV user who owns or drives the EV or an organization that owns and operates the EVs for their own business such as transportations, logistics, or rental services. A typical eMobility service provider executes a contract with the EV user including the organizations mentioned above and bills for the electricity based on the amount of the electricity used for the charging or the other billing criteria. From a business point of view, it is important to authenticate the EV user when the EV is charged because revenue of the eMobility service provider will be at risk if there is no adequate manner of authenticating the EV user. Further, the entire charging infrastructure and the power grid located behind the charging infrastructure are vulnerable to malicious attempts by an unauthorized group exploiting the security vulnerabilities for a political or financial motive or for a sense of fulfillment.

SUMMARY

To solve the problems above, provided is a cross certification method performed by an electric vehicle.

Provided is a power transfer method performed by a charge point operator.

Provided is a cross certification apparatus for an electric vehicle using the cross certification method.

According to an aspect of an exemplary embodiment, provided is a cross certification method performed by an electric vehicle (EV) for being supplied with electric power from an electric vehicle supply equipment (EVSE) associated with a charge point operator (CPO) having established a trust relationship with a first vehicle-to-grid (V2G) root certificate authority (CA) and trusts a second V2G root CA. The cross certification method includes: requesting charging from the EVSE; receiving, from the EVSE, a certificate chain maintained by the EVSE; and verifying that a last certificate in the certificate chain has been signed by the second V2G root CA.

The last certificate in the certificate chain may be a cross certificate issued by the second V2G root CA.

A public key in the cross certificate may coincide with a public key corresponding to a private key used to issue a last certificate excluding the cross certificate in the certificate chain.

The last certificate excluding the cross certificate in the certificate chain may have been issued by the first V2G root CA or the CPO.

The second V2G root CA may directly issue the cross certificate for the first V2G root CA by itself.

The second V2G root CA may issue the cross certificate for the first V2G root CA via a cross certification intermediating device.

The expiration date of the cross certificate may be set before expiration dates of a first V2G root certificate and a second V2G root certificate whichever is earlier.

A public key and an identification (ID) in a certificate issued by the first V2G root CA may be signed by using a private key corresponding to the cross certificate.

A public key and an identification (ID) in a CPO subordinate CA certificate may be signed by using a private key corresponding to the cross certificate.

According to another aspect of an exemplary embodiment, provided is a power transfer method performed by an electric vehicle supply equipment (EVSE) associated with a charge point operator (CPO) having established a trust relationship with a first vehicle-to-grid (V2G) root certificate authority (CA). The power transfer method includes: receiving a charging request from an electric vehicle (EV) trusting a second V2G root CA; providing a certificate chain maintained by the EVSE to the EV in response to the charging request; receiving a verification result for the certificate chain from the EV; and supplying electric power to the EV depending on the verification result.

A last certificate in the certificate chain may be a cross certificate issued by the second V2G root CA.

A public key in the cross certificate may coincide with a public key corresponding to a private key used to issue a last certificate excluding the cross certificate in the certificate chain.

The last certificate excluding the cross certificate in the certificate chain may have been issued by the first V2G root CA or the CPO.

The second V2G root CA may directly issue the cross certificate for the first V2G root CA by itself.

The second V2G root CA may issue the cross certificate for the first V2G root CA via a cross certification intermediating device.

The certificate chain may be sent to the EV in a Server-Hello message during a transport layer security (TLS) handshake operation.

A public key and an identification (ID) in a certificate issued by the first V2G root CA may be signed by using a private key corresponding to the cross certificate.

A public key and an identification (ID) in a CPO subordinate CA certificate may been signed by using a private key corresponding to the cross certificate.

According to yet another aspect of an exemplary embodiment, provided is a cross certification apparatus of an electric vehicle (EV) for being supplied with electric power from an electric vehicle supply equipment (EVSE) associated with a charge point operator (CPO) having established a trust relationship with a first vehicle-to-grid (V2G) root certificate authority (CA) and trusts a second V2G root CA. The cross certification apparatus includes: a processor; and a memory storing at least one instruction to be executed by the processor. The at least one instruction, when executed by the processor, causes the processor to: request charging from the EVSE; receive, from the EVSE, a certificate chain maintained by the EVSE; and verify that a last certificate in the certificate chain has been signed by the second V2G root CA.

The last certificate in the certificate chain may be a cross certificate issued by the second V2G root CA.

A public key in the cross certificate may coincide with a public key corresponding to a private key used to issue a last certificate excluding the cross certificate in the certificate chain.

The last certificate excluding the cross certificate in the certificate chain may have been issued by the first V2G root CA or the CPO.

The second V2G root CA may directly issue the cross certificate for the first V2G root CA by itself.

The second V2G root CA may issue the cross certificate for the first V2G root CA via a cross certification intermediating device.

The cross certification method of the present disclosure enables to manage the trusts flexibly in the EV charging network or system.

BRIEF DESCRIPTION OF DRAWINGS

FIG. 7 illustrates a certificate verification procedure in a system adopting the cross certification between the V2G operators according to an exemplary embodiment of the present disclosure;

FIG. 10 is a flowchart showing the cross certification method for EV charging according to an exemplary embodiment of the present disclosure;

FIG. 11 is a flowchart showing a power transfer method according to an exemplary embodiment of the present disclosure; and FIG. 12 is a block diagram of a cross certification apparatus according to an exemplary embodiment of the present disclosure.

DETAILED DESCRIPTION

Figure 1:
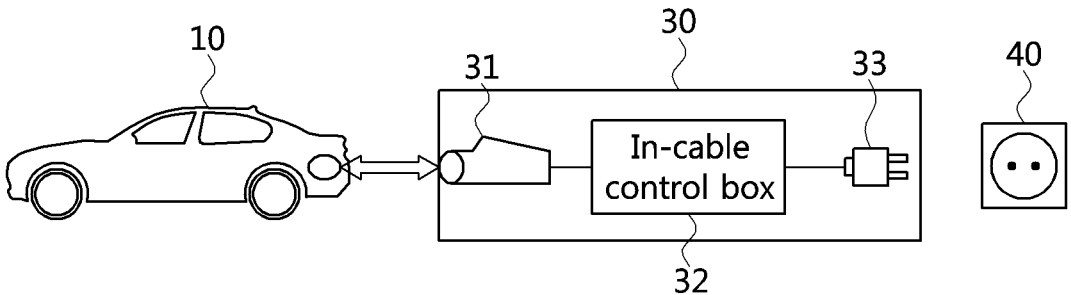
FIG. 1 is a conceptual diagram illustrating an EV conductive charging system to which an exemplary embodiment of the present disclosure may be applied.

For a more clear understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure.

When a component is referred to as being "connected" or "coupled" to another component, the component may be directly connected or coupled logically or physically to the other component or indirectly through an object therebetween. In contrast, when a component is referred to as being "directly connected" or "directly coupled" to another component, it is to be understood that there is no intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in Vehicle (PV)": An electric vehicle rechargeable through wireless charging from an electric vehicle supply equipment (EVSE) without using a physical plug or a physical socket.

"Heavy duty vehicle (H.D. Vehicle)": Any four- or more wheeled vehicle defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads, and highways and rated at less than 4,545 kg gross vehicle weight.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility, the power grid, an energy storage device, a fuel cell generator and the EV through a contactless channel such as electromagnetic induction and resonance.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly capable of transferring power. The automatic charging may be performed after obtaining necessary authentication and access.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": A transformer formed by the coil in a ground assembly (GA) coil and the coil in a vehicle assembly (VA) coil that allows power to be transferred with galvanic isolation.

"Inductive coupling": A magnetic coupling between two coils. One of the two coils may refer to the ground assembly (GA) coil, and the other one of the two coils may refer to the vehicle assembly (VA) coil.

"Ground assembly (GA)": An assembly on the ground or infrastructure side including the GA coil, a power/frequency conversion unit, and GA controller as well as the wiring from the grid and between each unit, filtering circuits, housing(s) etc., necessary to function as the power source of wireless power charging system. The GA may include components suitable for controlling impedances and resonant frequencies including ferrites and electromagnetic shielding materials for enhancing magnetic flus paths.

"Vehicle assembly (VA)": An assembly within the vehicle including the VA coil, rectifier/power conversion unit and VA controller as well as the wiring to the vehicle batteries and between each unit, filtering circuits, housing(s), etc., necessary to function as the vehicle part of a wireless power charging system. The VA may include components suitable for controlling impedances and resonant frequencies including ferrites and electromagnetic shielding materials for enhancing magnetic flus paths.

The GA may be referred to as a supply device, a primary device, and so on, and the VA may be referred to as an EV device, a secondary device, and so on.

"Primary device": An apparatus which provides a contactless coupling to the secondary device. In other words, the primary device may be an apparatus extraneous to an EV. When the EV is receiving power, the primary device may act as a source of the transferred power. The primary device may include the housing and all covers.

"Secondary device": An apparatus mounted within the EV which provides the contactless coupling to the primary device. In other words, the secondary device may be installed within the EV. When the EV is receiving power, the secondary device may transfer the power from the primary to the EV. The secondary device may include the housing and all covers.

"GA controller": A portion of the GA which regulates the output power level to the GA coil based on information from the vehicle.

"VA controller": A portion of the VA which monitors certain in-vehicle parameters during charging and initiates communication with the GA to adjust an output power level.

The GA controller may be referred to as a primary device communication controller (PDCC), and the VA controller may be referred to as an electric vehicle communication controller (EVCC).

"Magnetic gap": A vertical distance between the plane of the higher of the top of the litz wire or the top of the magnetic material in the GA coil to the plane of the lower of the bottom of the litz wire or the magnetic material in the VA coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom of the litz wire or the magnetic material in the VA Coil mounted within a vehicle to the ground surface.

"VA Coil magnetic surface distance": A distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions may output a harmful electric shock.

"Live component": Any conductor or conductive component intended to be electrically energized in normal use.

"Direct contact": A contact of persons with live components. (See IEC 61440)

"Indirect contact": A contact of persons with exposed, conductive, and energized components made live by an insulation failure. (Sec IEC 61140)

"Alignment": A process of detecting a relative position of primary device to secondary device and/or detecting the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishing a relationship between two peer communication entities.

"High level communication (HLC)": A particular type of digital communication. The HLC is necessary for additional services which are not covered by command & control communication. The data link of the HLC may use a power line communication (PLC), but it is not limited.

"Low power excitation (LPE)": A technique of activating the primary device for the fine positioning and pairing to allow the EV to detect the primary device, and vice versa.

"Service set identifier (SSID)": A unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, it may not provide any security features to the network.

"Extended service set identifier (ESSID)": A name of a network to which one desires to connect. It is similar to SSID but may be a more extended concept.

"Basic service set identifier (BSSID)": The BSSID typically consists of 48 bits and is used to distinguish a specific BSS. In the case of an infrastructure BSS network, the BSSID may be a medium access control (MAC) of the AP equipment. For an independent BSS or ad hoc network, the BSSID may be generated with any value.

A charging station may include at least one GA and at least one GA controller configured to manage the at least one GA. The GA may include at least one wireless communication device. The charging station may refer to a location having at least one GA, which is installed in home, office, public place, road, parking area, etc.

Hereinbelow, exemplary embodiments of the present disclosure will be described in detail with reference to the accompanying drawings.

FIG. 1 is a conceptual diagram illustrating an EV conductive charging system to which an exemplary embodiment of the present disclosure may be applied.

As shown in FIG. 1, the EV conductive charging may be performed based on an interworking of an EV charging cable 30, an EV 10, and a power outlet 40 installed in an existing building or charging stand.

The EV 10 may be generally defined as an automobile that supplies an electric current from a rechargeable energy storage device such as a battery mounted on the EV 10 as an energy source of an electric motor.

The EV 10 may be a hybrid electric vehicle (HEV) having an electric motor as well as an internal combustion engine. Also, the EV 10 may be not only an automobile but also a motorcycle, a cart, a scooter, or an electric bicycle.

Further, the EV 10 according to the present disclosure may include an inlet for the conductive charging of its battery. Here, the EV 10 of which battery may be conductively charged may be referred to as a plug-in electric vehicle (PEV) as defined above.

The inlet provided in the EV 10 according to the present disclosure may support a slow charging or a rapid charging. Here, the EV 10 may include either a single inlet that supports both of the slow charging and the rapid charging through a single plug connection, or inlets that respectively support the slow charging and the rapid charging.

In addition, the EV 10 according to the present disclosure may further include an on-board charger (OBC) to support the slow charging by an alternating current (AC) power supplied from a general power system. The OBC may boost a level of the AC power supplied from the general power system and convert into a direct current (DC) power to supply the DC power to the battery of the EV 10 during the course of the slow charging. Accordingly, in case the AC power for the slow charging is supplied to the inlet of the EV 10, the slow charging may be performed through the OBC. In contrast, in case the DC power for the rapid charging is supplied to the inlet of the EV 10, the rapid charging may be performed without an intervention of the OBC.

The EV charging cable 30 may include at least one of a charging plug 31 connected to the inlet of the EV 10, an outlet plug 33 connected to the outlet 40, or an in-cable control box (ICCB) 32.

The charging plug 11 may be a connection part that can be electrically connected to the inlet of the EV 10. The ICCB 12 may communicate with the EV 10 to receive status information of the EV or to control the electric power charging of the EV 10.

Although the ICCB 12 is illustrated as being included in the EV charging cable 10, the ICCB 12 may be mounted in a place other than the EV charging cable 10 or may be combined with an SECC described below or replaced by the SECC.

The outlet plug 13, which is suitable for being connected to the outlet of the charging stand to receive the power, may be an electrical connection member such as a general plug or a cord set.

The electric power outlet 30 may refer to an outlet installed at various places such as a parking lot attached to a house of an owner of the EV 10, a parking area for charging an EV at a gas station, or a parking area at a shopping center or an office building, for example.

In addition, a device referred to as a supply equipment communications controller (SECC) may be installed in a building or place (e.g., a charging stand) where the outlet 30 is installed to control a charging procedure by communicating with one of the components of the ICCB 12 or the EV 10 (e.g., electric vehicle communications controller (EVCC)).

The SECC may communicate with a power grid, an infrastructure management system that manages the power grid, a management server (hereinbelow, referred to as 'server') of the building in which the outlet 30 is installed, or an infrastructure server through wired or wireless communications.

The power outlet 40 may supply the AC power of the power system as it is. For example, the power outlet 40 may supply the AC power corresponding to at least one of single-phase two-wire (1P2W) system or a three-phase four-wire (3P4W) system.

The EV charging cable 30 may support the slow charging and supply the electric power for the slow charging to the EV 10. The electric power supplied to the EV 10 for the slow charging may be in a range of 3.3 to 7.7 kWh.

The EV charging cable 30 may support the rapid charging and supply the electric power for the rapid charging to the EV 10. The electric power supplied to the EV 10 for the rapid charging may be in a range of 50 to 100 kWh.

Figure 2:
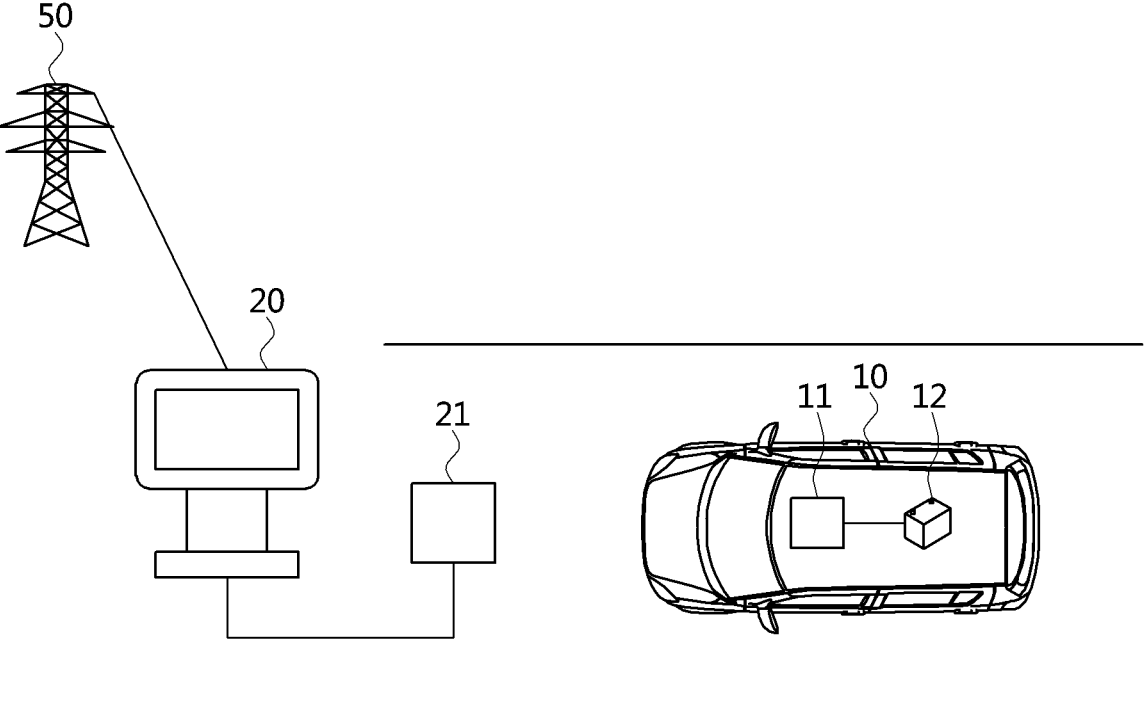
FIG. 2 is a conceptual diagram illustrating a wireless power transfer (WPT) system to which an exemplary embodiment of the present disclosure may be applied.

FIG. 2 is a conceptual diagram illustrating a concept of a wireless power transfer (WPT) to which an exemplary embodiment of the present disclosure may be applied.

As shown in FIG. 2, a WPT may be performed by at least one component of an electric vehicle (EV) 10 and a charging station 20 and may be used for transferring power to the EV 10 without any wire.

Particularly, the EV 10 may be usually defined as a vehicle that supplies an electric power stored in the rechargeable energy storage including a battery 12 to an electric motor in a power train system of the EV 10.

The EV 10 according to an exemplary embodiment of the present disclosure may include a hybrid electric vehicle (HEV) having an electric motor as well as an internal combustion engine, and may include not only an automobile but also a motorcycle, a cart, a scooter, and an electric bicycle.

The EV 10 may include a power reception pad 11 that has a reception coil suitable for receiving the electric power for charging the battery 12 wirelessly or and may include a plug receptacle suitable for receiving the electric power for conductively charging the battery 12. In particular, the EV 10 configured for conductively charging the battery 12 may be referred to as a plug-in electric vehicle (PEV).

The charging station 20 may be connected to the power grid 50 or a power backbone, and may provide the AC power to a power transmission pad 21 having a transmission coil via a power link.

The charging station 20 may communicate with the power grid 50, or the infrastructure management system or an infrastructure server that manages the power grid, and may be configured to perform wireless communications with the EV 10.

The wireless communications may be performed through Bluetooth, Zigbee, cellular, wireless local area network (WLAN), or the like.

Additionally, the charging station 20 may be located at various places including a parking area attached to the owner's house of the EV 10, a parking area for charging an EV at a gas station or the like, a parking area at a shopping center or a workplace, but is not limited thereto.

The wireless power transfer to the battery 12 of the EV 10 may be performed as follows. First, the power reception pad 11 of the EV 10 is disposed in an energy field generated by the power transmission pad 21. Then the reception coil in the power reception pad 21 and the transmission coil in the power transmission pad 11 are coupled to and interacts each other. An electromotive force may be induced in the power reception pad 11 as a result of the coupling or the interaction, and the battery 12 may be charged by the induced electromotive force.

The charging station 20 and the power transmission pad 21 as a whole or in part may be referred to as the ground assembly (GA), of which meaning and function were defined above.

Also, all or part of the power reception pad 11 and other internal components of the EV 10 may be referred to as the vehicle assembly (VA), of which meaning and function were defined above.

The power transmission pad or the power reception pad may be configured to be non-polarized or polarized.

In case the pad is non-polarized, there is one pole in a center of the pad and an opposite pole around an external periphery of the pad. The magnetic flux may be formed to exit from the center of the pad and return to external boundaries of the pad.

In case the pad is polarized, the pad may have respective poles at opposite end portions of the pad. The magnetic flux may be formed based according to an orientation of the pad.

Meanwhile, according to ISO 15118 which is a communication standard document for the electric vehicle charging, the EV and an electric vehicle supply equipment (EVSE) control the entire charging process by exchanging messages. In detail, the electric vehicle communications controller (EVCC) and the supply equipment communications controller (SECC) performs the communication for the electric vehicle charging.

After the EV verifies the identity of the EVSE to ensure that the EVSE is a trusted facility approved by a trusted operator, the EV establishes a secure channel with the EVSE to protect communications from an unauthorized access. Such a communication security may be secured by Transport Layer Security (TLS) which is a standardized protocol defined in Request for Comments (RFC) 5246, Internet Engineering Task Force (IETF). A TLS session may be established by a TLS session establishment procedure after an establishment of an IP-based communication connection. The security of the TLS relies on an assumption of trust of the EV for a trusted operator to which the EVSE belongs.

Figure 3:
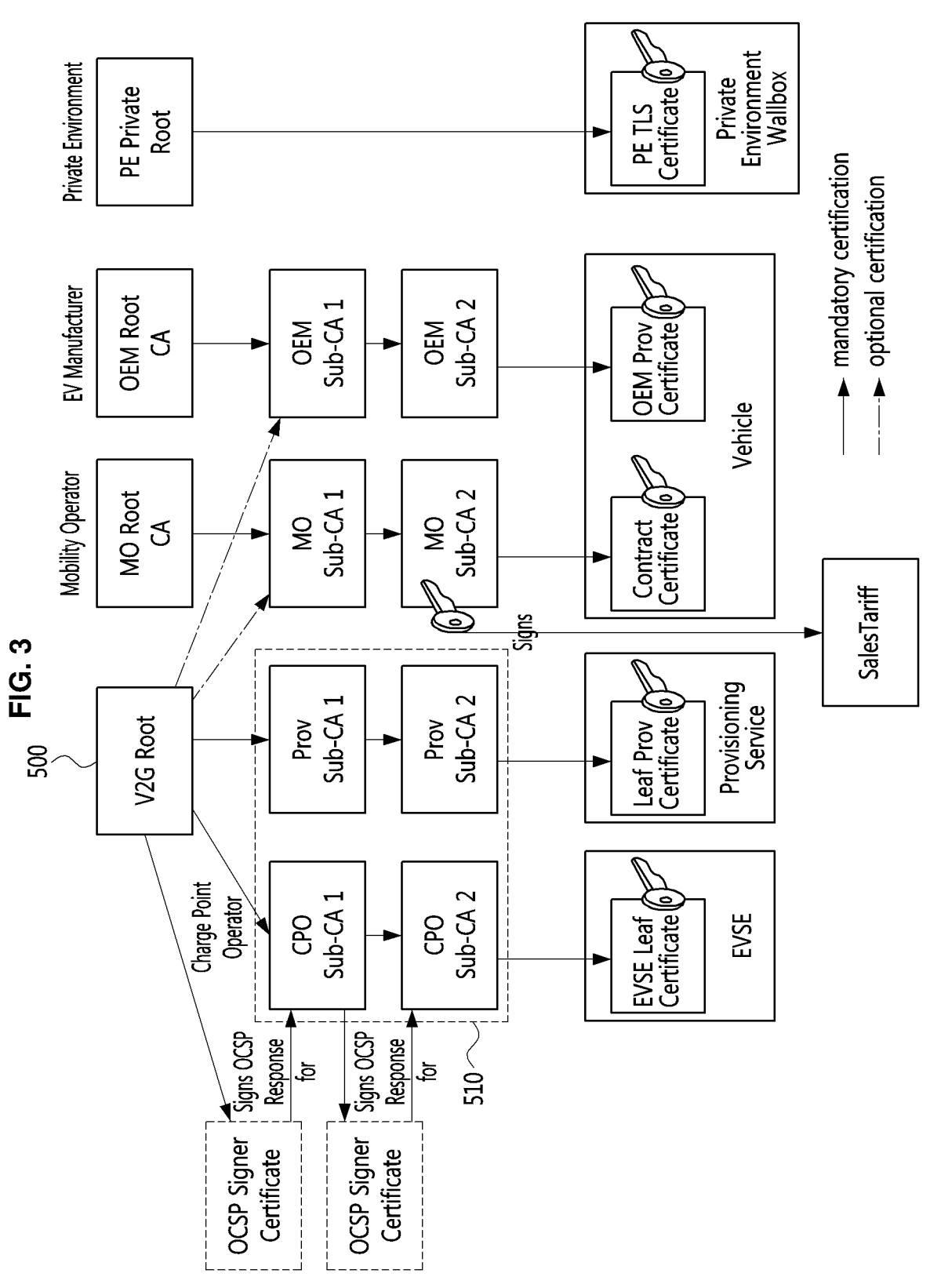
FIG. 3 illustrates an overview of a certificate structure in an electric vehicle charging system to which the present disclosure may be applied.

FIG. 3 illustrates an overview of a certificate structure in a charging system to which the present disclosure may be applied.

FIG. 3 visually depicts the certificate structure according to the ISO 15118 standard.

As shown in FIG. 3, an original equipment manufacturer (OEM) provisioning certificate is independent from public key infrastructure (PKI) sets of secondary actors which is under a global root certificate. A root certificate (OEM root CA cert) for the OEM provisioning certificate may be generated by an OEM itself. However, it is also possible to reuse a vehicle-to-grid (V2G) root certificate (V2G root CA cert) as a mobility operator root certificate (MO root CA cert) or the OEM root certificate (OEM root CA cert), as indicated by dashed lines.

According to the ISO 15118 standard, the V2G operator may issue a digital certificate to entities related with an EV charging infrastructure. In particular, the V2G operator may set a V2G root certification authority (V2G root CA) to issue the self-signed root certificate (V2G Root CA cert) 500, and issue an intermediate certificate (V2G Sub-CA cert) 510 to a V2G subordinate certification authority (V2G Sub-CA). The V2G subordinate certification authority (V2G Sub-CA) may issue certificates for the EVSE or other subordinate certification authorities (V2G Sub-CAs).

Referring to FIG. 3, there may be up to two intermediate certificates (V2G Sub-CA certs) between the V2G root certificate (V2G Root CA Cert) and an EVSE leaf certificate. The certificates from the EVSE leaf certificate to a last intermediate certificate (CPO Sub-CA1 cert) issued by the V2G root CA may be referred to as a certificate chain for the EVSE. The certificate chain for the EVSE may include two certificates (EVSE leaf cert and CPO Sub-CA1 cert) or 3 certificates (EVSE leaf cert, CPO Sub-CA2 cert, and CPO Sub-CA1 cert). The certificates may be issued along the certificate chain, and the highest certificate in the chain may be the root certificate issued by the V2G root CA.

To prove its identity, the EVSE may send its certificate chain to the EV during a TLS handshaking process. Then, the EV validates the EVSE leaf certificate by verifying the signature of each certificate in the chain using the public keys included in the certificates in the chain. If the EV is not equipped with the V2G root certificate issued by the V2G root CA in advance, the EV cannot verify the signature of the last certificate in the chain. Therefore, the EV may have to maintain a series of V2G root certificates issued by the trusted V2G operators as trust anchors.

The EV may store only a limited number of V2G root certificates in a consideration of a burden of EV memory check. Further, once the EV is sold out to an EV user, it is difficult to update the trust anchors. Accordingly, a situation may arises in which the EV user cannot charge the EV at an EVSE which has a certificate issued by at least one trusted V2G operator. In particular, such a situation may cause an inconvenience to the EV user when the EV moved into an area where there is no EV charging infrastructure certified by the trusted V2G operator. The only solution to this problem available currently is to bring the EV to a factory and install a new set of trust anchors or replace the set of trust anchors which the EV user needs in the new area. However, this method incurs a very high cost and is inconvenient and unreliable.

The present disclosure provides a cross certification method to solve the problem.

Method of implementing the cross certification according to the present disclosure may include a cross certification between two V2G CAs, a cross certification between a V2G CA and an OEM CA, and a cross certification using a separate cross certification broker, e.g. a bridge-CA.

Figure 4A:
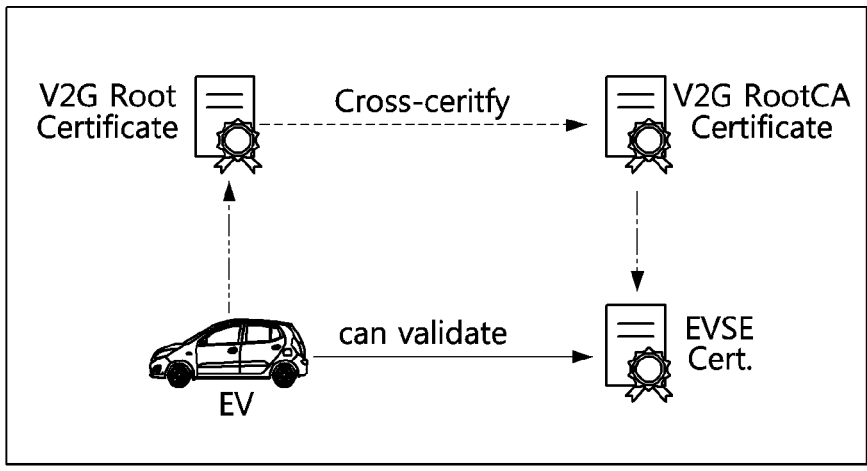
FIGS. 4A and 4B illustrate a concept of a cross certification between V2G root certification authorities (CAs) according to an exemplary embodiment of the present disclosure.
Figure 4B:
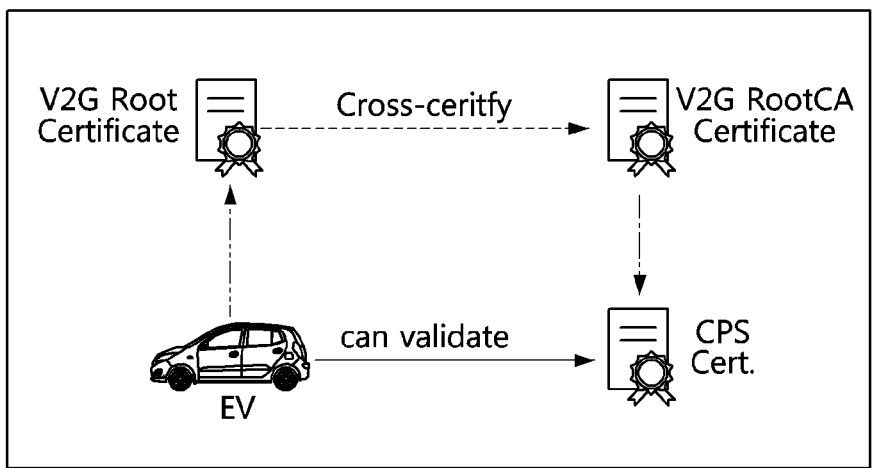

FIGS. 4A and 4B illustrate a concept of the cross certification between the V2G root CAs according to an exemplary embodiment of the present disclosure.

As shown in FIG. 4A, if there is a cross certificate contract concluded between V2G operators, an EV trusting a certain V2G root CA may receive a charging service from an EVSE having a certificate issued by a subordinate CA of another V2G root CA. Also, as shown in FIG. 4B, an EV trusting a certain V2G root CA may verify a certificate signed by a certificate provisioning service (CPS) of another V2G root CA. That is, the EV may validate the certificate issued by a subordinate CA of another V2G root CA.

Figure 5:
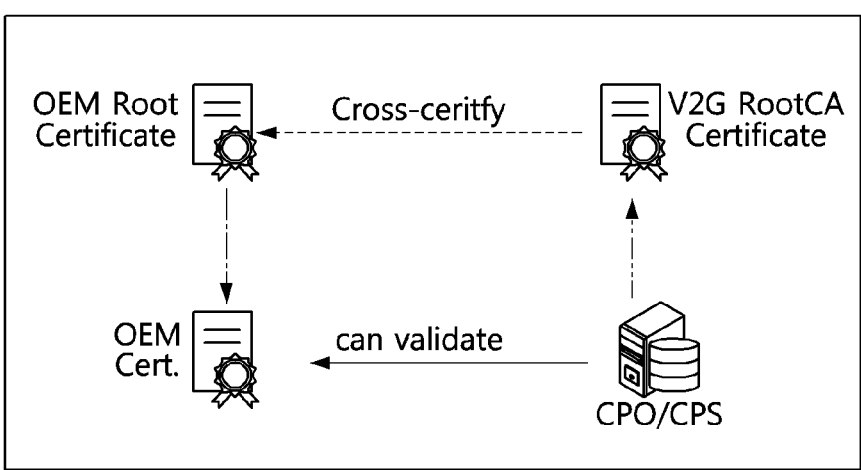
FIG. 5 illustrates a concept of a cross certification between a V2G root CA and an OEM root CA according to another exemplary embodiment of the present disclosure.

FIG. 5 illustrates a concept of the cross certification between the V2G root CA and the OEM root CA according to another exemplary embodiment of the present disclosure.

Referring to FIG. 5, a charge point operator (CPO) or the CPS may verify an OEM certificate without the OEM root certificate when the cross certification between the V2G root CA and the OEM root CA is used.

The cross certification according to the present disclosure enables the EV to validate the EVSE certificate chain even when the EVSE certificate chain is not issued by the V2G CAs trusted by the EV. In other words, even if the EVSE certificate chain ends with an intermediate certificate issued based on a V2G root certificate which is not maintained by the EV, the EVSE may prove that the certificate chain has been cross certified by one of the V2G operators trusted by the EV, and the EV may validate the certificate chain.

This is possible because, according to a validation process defined in the RFC 5280, the verification may be successful as long as a certificate chain leads to a trusted V2G root certificate along a signature validation path.

Figure 6:
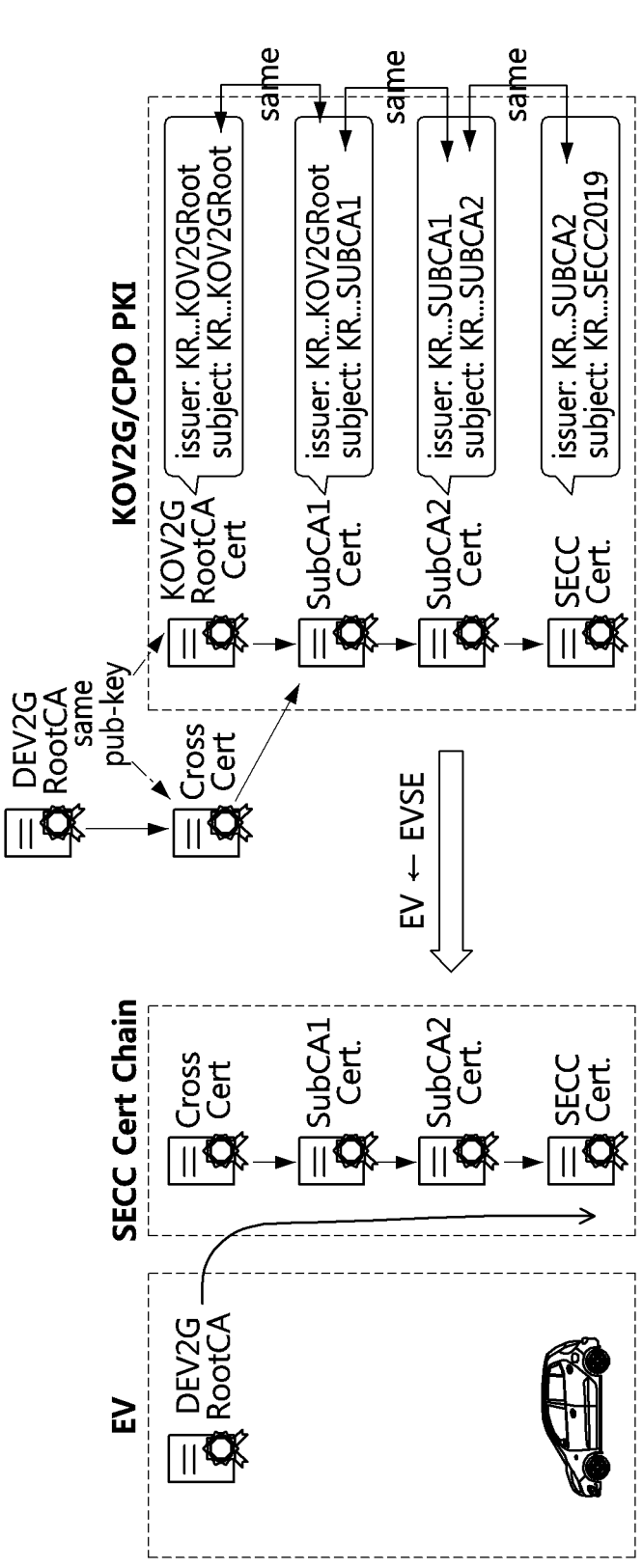
FIG. 6 illustrates a cross certification method between the V2G root CAs according to an exemplary embodiment of the present disclosure.

FIG. 6 illustrates the cross certification method between the V2G root CAs according to an exemplary embodiment of the present disclosure.

In the embodiment of FIG. 6, it is assumed that a SECC certificate chain includes the SECC leaf certificate (i.e. EVSE leaf certificate), a second intermediate certificate (Sub-CA 2 cert), and a first intermediate certificate (Sub-CA 1 cert), and the first intermediate certificate (Sub-CA 1 cert) has been signed by the V2G-A root certificate (denoted by 'KRV2G root CA cert' in FIG. 6).

Here, the first intermediate certificate (Sub-CA 1 cert) may be issued to a charge point operator (CPO), and the V2G root certificate is issued to itself by the V2G root CA. The SECC leaf certificate and the second intermediate certificate (Sub-CA 2 cert) are issued by the CPO. The first intermediate certificate (Sub-CA 1 cert) and the KOV2G root certificate are issued by the KOV2G root CA.

If the cross certification is not used in the system and the EV has a V2G-B root certificate (DE V2G root CA cert), the signature of the issuer of the first intermediate certificate (Sub-CA 1 cert) cannot be verified using the public key of the V2G-B root certificate.

If, however, a V2G-B root CA (DE V2G root CA) issues a cross certificate (cross cert; x-cert) for the V2G-A root CA (KRV2G root CA) and the cross certificate is added to an end of the certificate chain, the EV can trust the chain. More specifically, the EV may successfully trace and verify the SECC leaf certificate, the second intermediate certificate (Sub-CA 2 cert), the first intermediate certificate (Sub-CA 1 cert), the cross certificate (x-cert), and the V2G-B root certificate in that order to trust the identity of the EVSE presenting the certificates under the trusted V2G-B root certificate.

The EV trusting only the V2G-B PKI set may utilize the charging infrastructure operated based on the V2G-A PKI set by using the cross certification as follows.

First, the V2G-A operator may conclude a contract for the cross certification with the V2G-B operator. Accordingly, the CPS of the V2G-B root CA may issue a cross certificate (CrossB2A) by signing the public key and the identification (ID) of the V2G-A root CA with a private key of the V2G-B root CA. In this case, the expiration date of the cross certificate (CrossB2A) may be set before the expiration dates of the V2G-A root certificate and the V2G-B root certificate whichever is earlier. The cross certificate (CrossB2A) generated as above may be distributed to all the EVSEs under the V2G-A root CA.

Afterwards, when an EVSE under the V2G-A root CA meets an EV that trusts only the V2G-B root CA, the EVSE may send the certificate chain including the cross certificate (CrossB2A) in a ServerHello message, for example, during a transport layer security (TLS) handshake operation. Since the public key in the cross certificate (CrossB2A) is identical to the public key in the V2G-A root certificate, the EV can successfully verify the signature of the last intermediate certificate (Sub-CA 1 cert) in the certificate chain with the cross certificate (CrossB2A). The EV can successfully complete the validation procedure by verifying that the cross certificate (CrossB2A) has been signed by the trusted V2G-B root CA.

Figure 7:
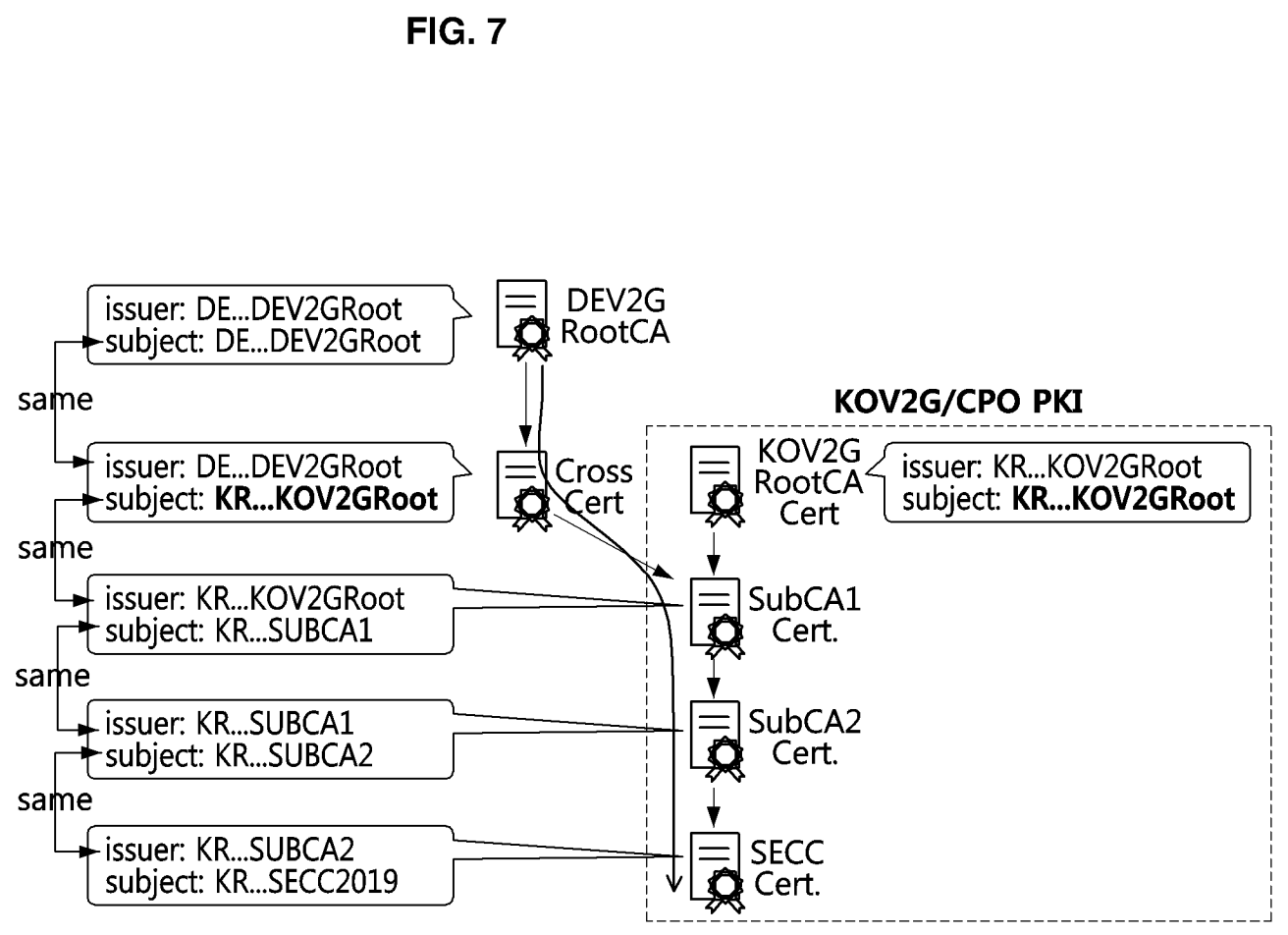

FIG. 7 illustrates a certificate verification procedure in a system adopting the cross certification between the V2G operators according to an exemplary embodiment of the present disclosure.

According to the embodiment shown in FIG. 7, the DE V2G operator and the KR V2G operator may conclude the cross certification contract, and the DE V2G root CA may issue the cross certificate (CrossB2A). The issuer of the cross certificate (CrossB2A) is "DE . . . DE V2G root CA" and the subject of the cross certificate is "KR . . . KRV2G root CA". Also, in the embodiment shown in FIG. 7, the subject "KR . . . KRV2G root CA" of the cross certificate may be the same as the subject of another cross certificate (KOV2G root CA cert).

Figure 8A:
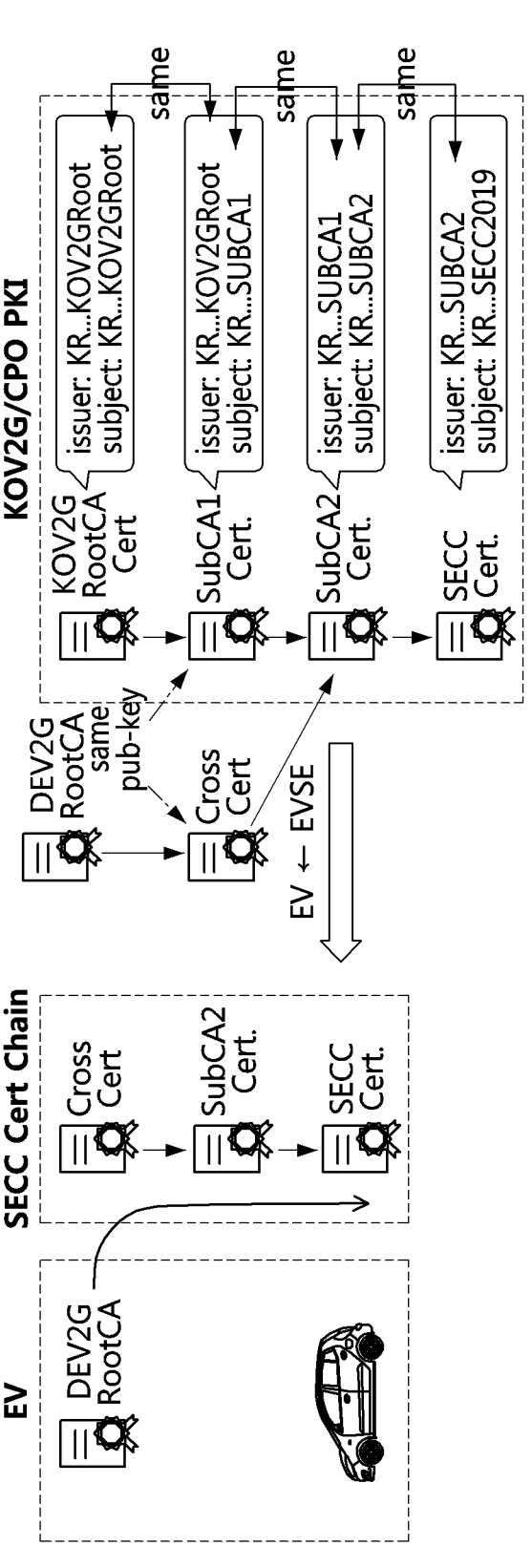
FIGS. 8A and 8B show the cross certification method between the V2G operators according to another embodiment of the present disclosure.
Figure 8B:
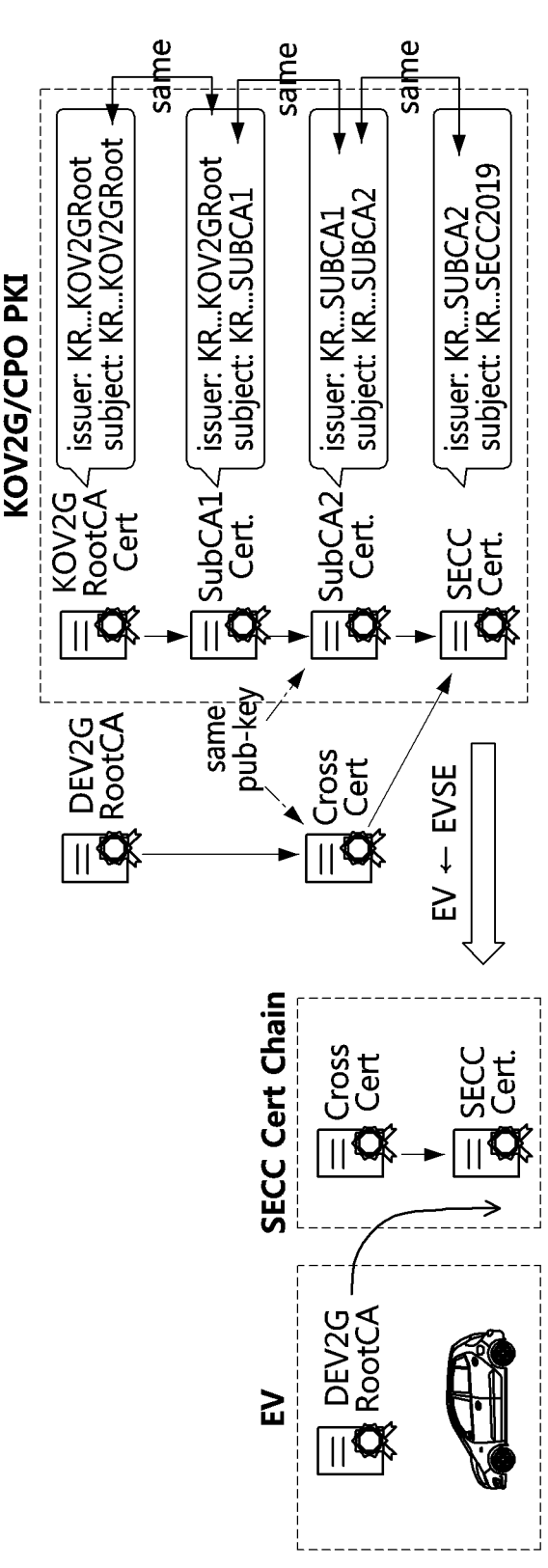

FIGS. 8A and 8B show the cross certification method between the V2G operators according to another embodiment of the present disclosure.

According to the present embodiment, the cross certificate may be issued to the subordinate certification authorities (Sub-CA 1 or Sub-CA 2) rather than the root CA. FIG. 8A shows an example in which the cross certificate is issued to the first subordinate CA (Sub-CA 1), and FIG. 8B shows an example in which the cross certificate is issued to the second subordinate CA (Sub-CA 2).

This method enables to maintain the certificate chain length shorter. For example, the ISO 15118-2:2014 standard limits the certificate chain length to three and the ISO 15118-20 standard which is currently under preparation for establishment may limit the certificate chain length to four. The cross certification method of the present embodiment may facilitate to meet the provisions of these standards by reducing the certificate chain length by one or two.

Meanwhile, according to another embodiment of the present disclosure, the cross certification may be accomplished in multiple stages. For example, the V2G-A root certificate be cross-certified by the V2G-B root CA, and the V2G-B root certificate may be cross-certified by a V2G-C root CA. Such a multi-level cross certification may provide flexibility and scalability of the interoperability between the V2G operators. A possible application of this feature may be the cross certification broker. The cross certification broker may conclude contracts with a plurality of V2G operators to cross-certify each other. As a result, the interoperability between the V2G operators associated with the cross certification broker by respective contracts may be enhanced.

Figure 9A:
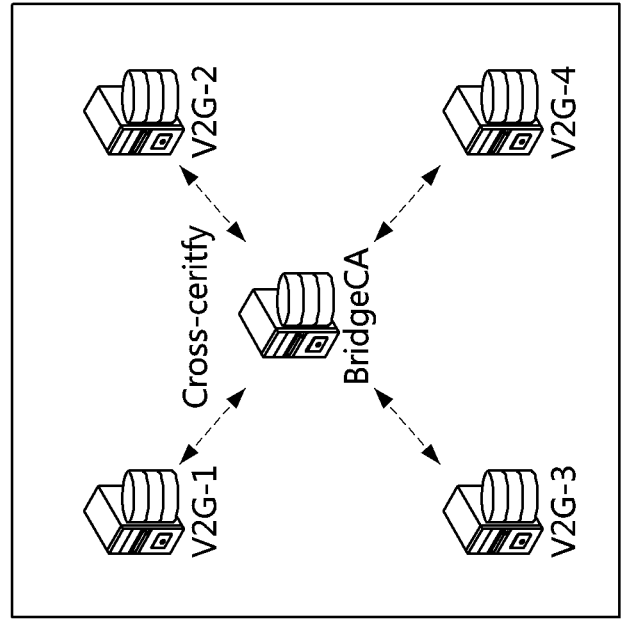
FIGS. 9A and 9B illustrate a concept of a cross certification using a bridge CA according to another embodiment of the present disclosure.
Figure 9A:
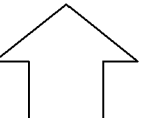
Figure 9A:
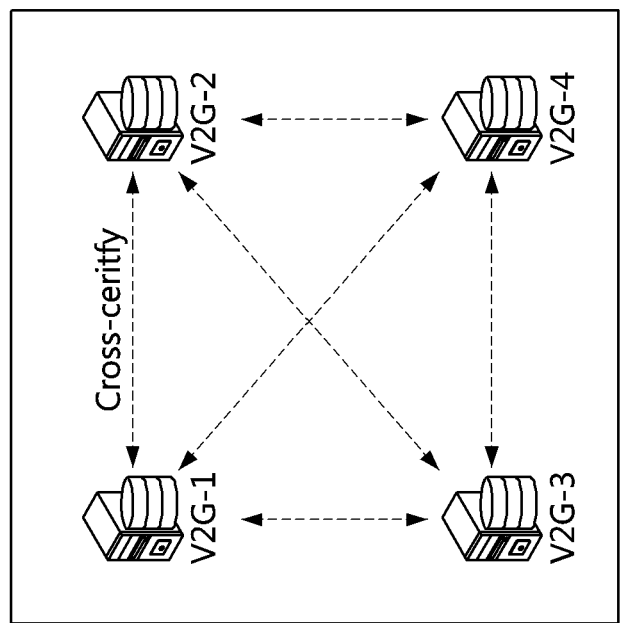
Figure 9B:
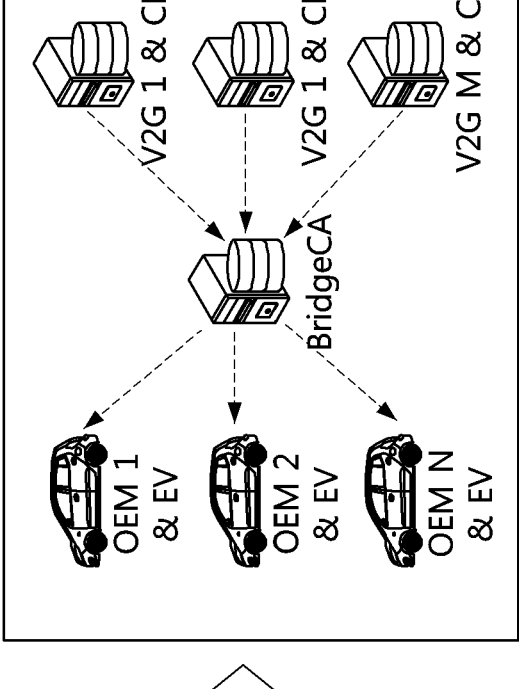
Figure 9B:
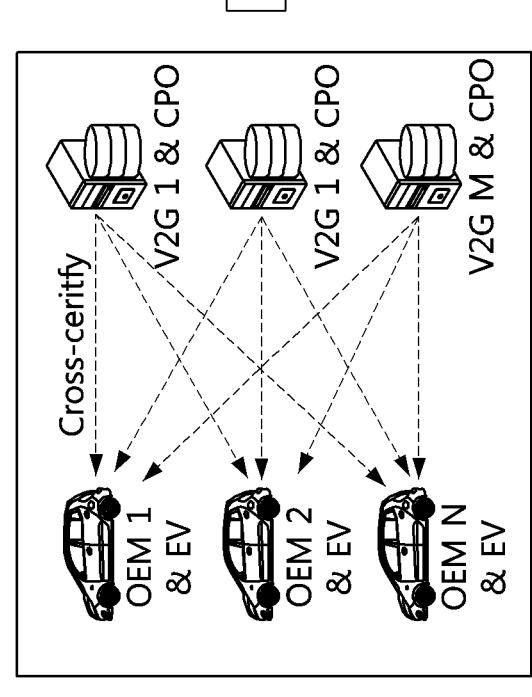

FIGS. 9A and 9B illustrate a concept of a cross certification using a bridge CA according to another embodiment of the present disclosure.

Referring to FIG. 9A, when the cross certifications are required among four V2G CAs, for example, the cross certifications may be accomplished through a separate bridge CA instead of individual cross certifications between all the possible pairs among the V2G CAs. The bridge CA may enhance the interoperability between the V2G CAs and the scalability in an environment where more V2G CAs may be added.

FIG. 9B shows that a roaming service may be available in a system where a simple PnC scheme is applied by use of the bridge CA.

FIG. 10 is a flowchart showing the cross certification method for EV charging according to an exemplary embodiment of the present disclosure.

The cross certification method shown in FIG. 10 may be performed by the EV that needs to be supplied with electric power from the EVSE operated by a charge point operator (CPO) having a contractual relationship with the first V2G root CA. In this case, it is assumed that the EV has a trust relationship with the second V2G root CA. In particular, the operator of the first V2G root CA may conclude a certification contract with the operator of the second V2G root CA directly or through an intermediating device.

First, the EV that needs charging may request charging from the charge point operator (S1010). The charge point operator may include the EVSE. A charging request may include a certificate installation request (CertificateInstallationReq) message, and an element 'ListOfRootCertIDs' for the root certificate ID list in the CertificateInstallationReq message may be set to "[(V2G1, <serial>)]".

The EV may receive a certificate chain maintained by the charge point operator from the charge point operator as a response to the charging request (S1020). The certificate chain may be a CPS certificate chain and may be included in a certificate installation response (CertificateInstallationRes) message.

Upon receiving the certificate chain, the EV may verify whether the last intermediate certificate in the certificate chain has been signed by the second V2G root CA (S1030). More specifically, the EV may check whether the cross certificate was signed by the second V2G root CA. That is, the last intermediate certificate in the certificate chain may be the cross certificate issued by the second V2G root CA.

The public key in the cross certificate may coincide with a public key corresponding to a private key used to issue the last certificate except for the cross certificate in the certificate chain. The certification authority having issued the last certificate other than the cross certificate in the certificate chain may be the first V2G root CA or the CPO.

The second V2G root CA may directly issue the cross certificate for the first V2G root CA by itself. Alternatively, the second V2G root CA may indirectly issue the cross certificate for the first V2G root CA via another device such as the other V2G root CA or the intermediating device.

FIG. 11 is a flowchart showing a power transfer method according to an exemplary embodiment of the present disclosure.

The power transfer method shown in FIG. 11 may be performed by a server operated by the charge point operator (CPO) having a trust relationship with the first V2G root CA or an individual EVSE operated by the CPO. However, the subject performing the method is indicated by the CPO in the following description for the sake of convenience in the description.

When the CPO having established a trust relationship with the first V2G route CA receives a charging request from the EV that trusts the second V2G route CA (S1110), the CPO may provide the certificate chain maintained therein to the EV (S1120). At this time, the CPO may send the certificate chain by including the certificate chain in the ServerHello message during the TLS handshake operation.

After the EV completes the verification of the certificate chain, the CPO may receive a verification result for the certificate chain from the EV (S1130).

Finally, the CPO may supply electric power to the EV depending on the verification result (S1140).

Here, the last certificate in the certificate chain may be the cross certificate issued by the second V2G root CA.

The public key in the cross certificate may coincide with a public key corresponding to a private key used to issue the last certificate except for the cross certificate in the certificate chain. The certification authority having issued the last certificate other than the cross certificate in the certificate chain may be the first V2G root CA or the CPO.

The second V2G root CA may directly issue the cross certificate for the first V2G root CA by itself. Alternatively, the second V2G root CA may indirectly issue the cross certificate for the first V2G root CA via another device such as the other V2G root CA or the intermediating device.

FIG. 12 is a block diagram of a cross certification apparatus according to an exemplary embodiment of the present disclosure.

The cross certification apparatus shown in FIG. 12 may be implemented in the EV that needs to receive electric power from the EVSE associated with the CPO having established a trust relationship with the first V2G root CA. It is assumed that the EV has established a trust relationship with the second V2G root CA.

The cross certification apparatus 100 may include at least one processor 110, a memory 120 for storing at least one program instruction to be executed by the processor 110, and a data transceiver 130 configure to perform communications through a network.

The processor 110 may execute program instructions stored in the memory 120. The processor 110 may include a central processing unit (CPU) or a graphics processing unit (GPU), or may be implemented by another kind of dedicated processor suitable for performing the methods of the present disclosure. The memory 120 may include, for example, a volatile memory such as a read only memory (ROM) and a nonvolatile memory such as a random access memory (RAM).

The data transceiver 130 may include an EVCC communicating with the SECC of the EVSE provided by the CPO.

The at least one program instructions may include: instructions configured to request charging from the EVSE; instructions configured to receive a certificate chain maintained by the EVSE from the EVSE; and instructions configured to verify whether the last certificate in the certificate chain has been signed by the second V2G root CA.

The last certificate in the certificate chain may be the cross certificate issued by the second V2G root CA.

The public key in the cross certificate may coincide with a public key corresponding to a private key used to issue the last certificate except for the cross certificate in the certificate chain. The certification authority having issued the last certificate other than the cross certificate in the certificate chain may be the first V2G root CA or the CPO.

The second V2G root CA may directly issue the cross certificate for the first V2G root CA by itself. Alternatively, the second V2G root CA may indirectly issue the cross certificate via another device such as the other V2G root CA or the intermediating device.

The cross certification method of the present disclosure described above based on exemplary embodiments enables to manage the trusts flexibly in the EV charging network or system.

The apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto. In particular, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments, at least one of most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods of the present disclosure are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of validating an electric vehicle supply equipment (EVSE) trusting a first root certificate authority (CA) performed by an electric vehicle (EV) to be charged from the EVSE and trusting a second root CA, the method comprising:

initiating communications with the EVSE;

receiving, from the EVSE, a certificate chain of the EVSE including a leaf certificate for the EVSE and a cross certificate issued by the second root CA for a subordinate certificate authority under the first root CA; and verifying the cross certificate and the leaf certificate for the EVSE based on a root CA certificate issued by the second root CA, wherein verifying the cross certificate and the leaf certificate for the EVSE comprises:

verifying the cross certificate and the leaf certificate for the EVSE based on the root CA certificate issued by the second root CA without a first root CA certificate issued by the first root CA.

2. The method of claim 1, wherein the certificate chain is maintained by the EVSE.

3. The method of claim 1, wherein verifying the cross certificate and the leaf certificate for the EVSE comprises:

verifying that a certificate in a highest level in the certificate chain has been signed by the second root CA.

4. The method of claim 3, wherein the certificate in the highest level in the certificate chain is the cross certificate.

5. The method of claim 4, wherein a public key included in the cross certificate coincides with a public key corresponding to a private key used to issue a certificate in a second highest level in the certificate chain.

6. The method of claim 5, wherein the certificate in the second highest level in the certificate chain has been issued by a charge point operator (CPO) associated with the EVSE.

7. The method of claim 4, wherein the cross certificate is issued by the second root CA via a cross certification intermediating device.

8. The method of claim 4, wherein an expiration date of the cross certificate is set before expiration dates of a first root certificate and a second root certificate whichever is earlier.

9. The method of claim 4, wherein the cross certificate comprises a public key of the subordinate certificate authority and a signature generated by signing an identification (ID) of the subordinate certificate authority by the second root CA.

10. A power transfer method performed by an electric vehicle supply equipment (EVSE) trusting a first root certificate authority (CA), the power transfer method comprising:

receiving a certificate-related request from an electric vehicle (EV) trusting a second root CA;

providing the EV with a certificate chain of the EVSE including a leaf certificate for the EVSE and a cross certificate issued by the second root CA for a subordinate certificate authority under the first root CA;

receiving a verification result for the certificate chain from the EV; and supplying electric power to the EV based on the verification result, wherein providing the EV with the certificate chain of the EVSE comprises:

providing the certificate chain ends with an intermediate certificate issued based on a first root CA certificate issued by the first root CA and the certificate chain does not include the first root CA certificate, and the verification result is determined by the EV without the first root CA certificate.

11. The power transfer method of claim 10, wherein a certificate in a highest level in the certificate chain is the cross certificate.

12. The power transfer method of claim 11, wherein the certificate in the highest level in the certificate chain has been signed by the second root CA.

13. The power transfer method of claim 11, wherein a public key included in the cross certificate coincides with a public key corresponding to a private key used to issue a certificate in a second highest level in the certificate chain.

14. The power transfer method of claim 13, wherein the certificate in the second highest level in the certificate chain has been issued by a charge point operator (CPO) associated with the EVSE.

15. The power transfer method of claim 11, wherein the cross certificate is issued by the second root CA via a cross certification intermediating device.

16. The power transfer method of claim 11, wherein the cross certificate comprises a public key of the subordinate certificate authority and a signature generated by signing an identification (ID) of the subordinate certificate authority by the second root CA.

17. The power transfer method of claim 10, wherein the certificate chain is sent to the EV in a ServerHello message during a transport layer security (TLS) handshake operation.

* * * * *